United States Patent
Ishihara et al.

(10) Patent No.: US 7,268,462 B2
(45) Date of Patent: Sep. 11, 2007

(54) ROTATING ELECTRICAL APPARATUS

(75) Inventors: Hiroyuki Ishihara, Shizuoka-ken (JP);
Haruyoshi Hino, Shizuoka-ken (JP);
Shinya Naito, Shizuoka-ken (JP);
Keiko Murota, Shizuoka-ken (JP);
Junji Terada, Shizuoka-ken (JP);
Tomohiro Ono, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 266 days.

(21) Appl. No.: 10/506,302

(22) PCT Filed: Aug. 8, 2003

(86) PCT No.: PCT/JP03/10179

§ 371 (c)(1),
(2), (4) Date: Sep. 1, 2004

(87) PCT Pub. No.: WO2004/015842

PCT Pub. Date: Feb. 19, 2004

(65) Prior Publication Data

US 2005/0104471 A1 May 19, 2005

(30) Foreign Application Priority Data

Aug. 9, 2002 (JP) ............................. 2002-233991

(51) Int. Cl.
*H02K 1/22* (2006.01)
(52) U.S. Cl. ..................................... 310/261
(58) Field of Classification Search ................ 310/261, 310/216, 217, 218
See application file for complete search history.

(56) References Cited

U.S. PATENT DOCUMENTS 3,999,092 A * 12/1976 Whiteley ............... 310/156.32
5,532,533 A * 7/1996 Mizutani .................. 310/68 B

FOREIGN PATENT DOCUMENTS

| JP | 06-189488 | 7/1994 |
| JP | 07-163115 | 6/1995 |
| JP | 09-215259 | 8/1997 |
| JP | 10-285852 | * 10/1998 |
| JP | 2000-308317 | 11/2000 |
| JP | 2001-045686 | 2/2001 |
| JP | 2001-112225 | 4/2001 |
| JP | 2001-136694 | 5/2001 |
| JP | 2001-248661 | 9/2001 |
| JP | 2003-127966 | 5/2003 |
| JP | 2003-134610 | 5/2003 |

OTHER PUBLICATIONS

Translation of JP 2001-045686 A.*

* cited by examiner

*Primary Examiner*—Dang Le
*Assistant Examiner*—Nguyen Hanh
(74) *Attorney, Agent, or Firm*—Hogan & Hartson LLP

(57) ABSTRACT

This invention provides a rotary electric machine with a high productivity/maintainability.

Since the shaft portion 43 or the stepwise drawn portion is formed with a flat face 47 perpendicular to the rotational axis, when the magnetic poles 42 are bonded to the rotor 40, an accurate gap control can be achieved by applying a certain pressure to the magnetic poles with a jig or the like using the perpendicular flat face 47 as reference, or by controlling the distance from the perpendicular flat face 47.

14 Claims, 7 Drawing Sheets

(a)

(b)

(a)

(b)

ROTATING ELECTRICAL APPARATUS

BACKGROUND OF THE INVENTION

1. Technical Field

This invention relates to a rotary electric machine such as an electric motor for use in an electric two-wheeler or the like, and particularly to a rotary electric machine of high productivity/maintainability.

2. Background Art

In recent years, an axial gap type electric motor is used on a rear axle of an electric two-wheeler, as a power source. Such a motor includes a stator fixed to a rear arm extending from a body frame, and a rotor rotating with respect to the stator for transmitting power to a rear wheel.

The rotor is configured such that a magnetic pole-carrying face and a shaft portion supported for rotation by a bearing are joined together, and transmits power to the rear wheel through a one-way clutch for the prevention of overcharging of the battery and for the mitigation of push and walk load.

Also, when magnetic poles are bonded on the yoke in a production process, the magnetic poles are mounted on the yoke to which is applied an adhesive, and they are pressed against the yoke for regulation such that their heights are set ideal.

As described above, a yoke of a rotor in an axial motor for an electric two-wheeler is configured such that a magnetic pole-carrying face and a shaft portion supported for rotation by a bearing are joined together, therefore production control is required for the processes such as welding or the like, or for each part, which lowers productivity and as a result, production costs are increased.

Also, the yoke of the rotor doesn't have a shape allowing accommodation of a one-way clutch, so that the lateral dimension of the rear wheel becomes wider, the air resistance becomes greater and further, the freedom of designing is decreased.

Also, the stator coil, when not being energized, is attracted by the magnetic poles of strong magnetic force, so that it is not easy to remove the rotor at the time of maintenance or the like of the electric two-wheeler.

Also, when magnetic poles are attached to the yoke, only the magnetic poles are pressed against the yoke, so that variations in the height of the magnetic poles are produced and a desired gap is difficult to be provided between the magnetic poles and the stator. Therefore, this results in a drop in productivity.

Such difficulties are true for rotary electric machines including generators.

In view of the foregoing, an advantage of this invention is to provide a rotary electric machine of high productivity/maintainability.

SUMMARY OF THE INVENTION

In order to solve the foregoing problems in the prior art, an embodiment of the present invention is directed to a rotary electric machine having a fixed stator, and a rotor rotated by electromagnetic energy from the stator. The rotor has in its radially outer region a magnetic pole-carrying face, a stepwise drawn portion concentrical with the face, and a cylindrical shaft portion, on the rotational axis of the rotor, formed in its radially inner region, the shaft portion or the drawn portion being formed with a face perpendicular to the rotational axis.

A space for a one-way clutch to be housed is formed by the stepwise drawn portion.

According to an embodiment of the present invention, the magnetic pole-carrying face, the stepwise drawn portion and the shaft portion are formed integral with each other. A female thread is formed in the face within the rotor perpendicular to the rotational axis around which the rotor rotates and also the female thread is formed on the rotational axis. Further the female thread is formed in a plurality around the rotational axis at regular intervals.

DETAILED DESCRIPTION OF THE INVENTION

Description will be made of an embodiment of the present invention with reference to the drawings.

Figure 1:
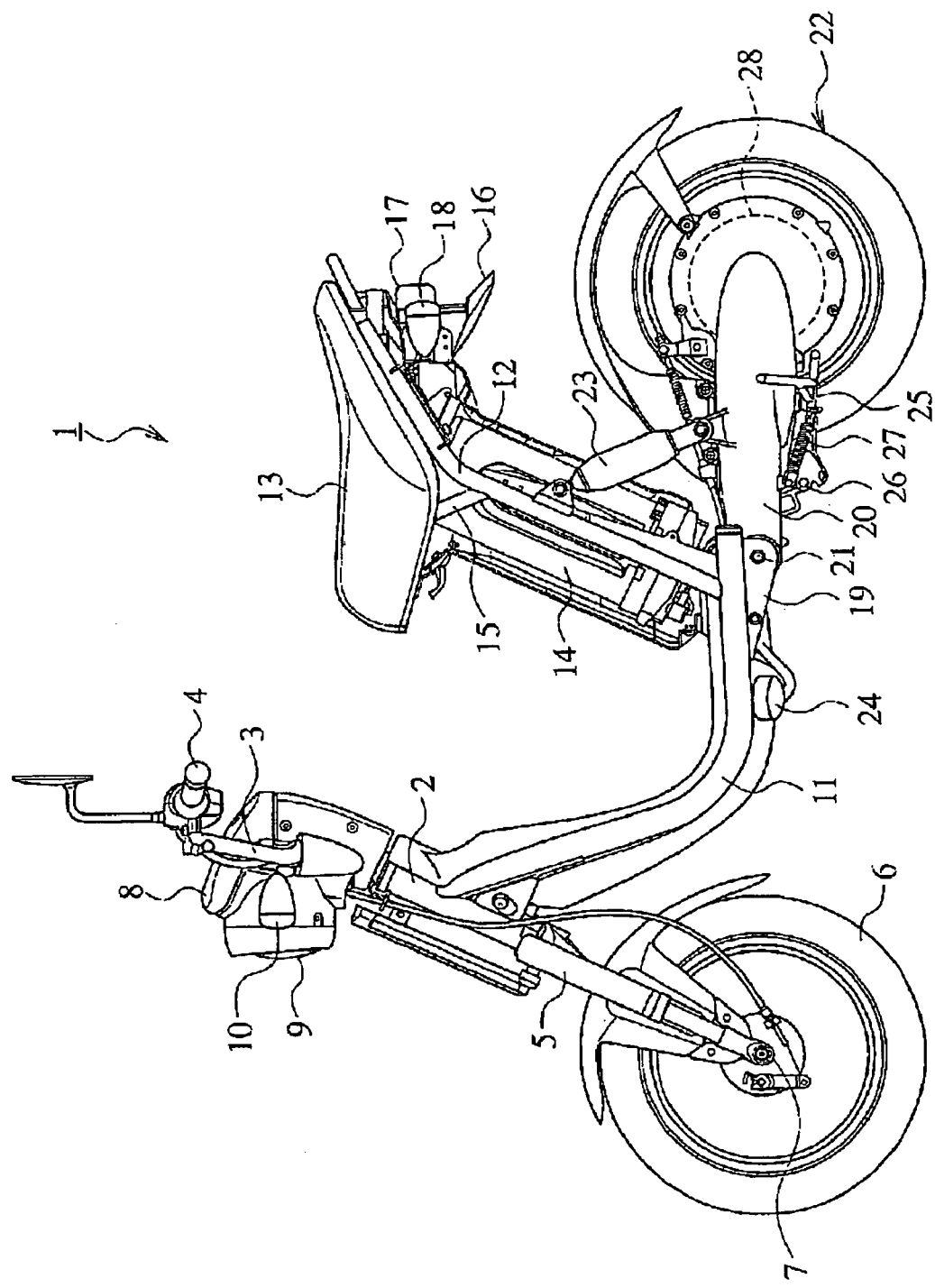
FIG. 1 is a side view of an electric two-wheeler applied to an electric motor according to this invention.

FIG. 1 is a side view of an electric two-wheeler employing an electric motor according to the present invention.

An electric two-wheeler 1 shown in FIG. 1 has a body including a head pipe 2 at an upper front part. A steering shaft (not shown) is rotatably inserted through the head pipe 2, and has an upper end to which handlebars 3 are attached. Grips 4 are fitted over the opposite ends of the handlebars 3. The grip 4 on the right side (on the far side in FIG. 1, not shown) constitutes a throttle grip which is rotatable.

The head pipe 2 has a lower part to which an upper part of a pair of right and left front forks 5 are attached. The front forks 5 have lower ends at which a front wheel 6 is rotatably mounted on a front wheel shaft 7. A meter 8 is disposed on the center of the handlebars 3 and a head lamp 9 is located under the meter 8. Flasher lamps 10 (only one of them is shown in FIG. 1) are provided on both sides of the head lamp 9.

A pair of right and left body frames 11 extend from the head pipe 2 toward the rear of the body. The body frames 11, which are made of circular pipes, extend obliquely downward from the head, pipe 2 toward the rear of the body, curve in an arc, and extend approximately horizontally toward the rear of the body. A pair of right and left body frames 12 extend obliquely upward from the rear ends of the body frames 11 and are connected to each other behind a seat 13. A battery 14 is located between the right and left body frames 12.

A seat stay (not shown) having an inverted U-shape is connected to the right and left body frames 12 and supported by a pair of right and left stays 16 (only one of them is shown in the drawing). The seat 13 is openably and closably mounted on the seat stay.

A rear fender 16 is attached to the rear ends of the body frames 12. A tail lamp 17 is attached on the rear surface of the rear fender 16. Flasher lamps 18 (only one of them is shown in the drawing) are arranged on right and left sides of the tail lamp 17.

A pair of right and left rear arm brackets 19 (only one of them is shown in the drawing) are attached by welding to the rear ends of the right and left body frames 11, respectively. A rear arm 20 is supported at the front end by the rear arm brackets 19 via a pivot shaft 21 for a vertical swinging movement. A rear wheel 22 as a driving wheel is rotatably mounted on the rear end of the rear arm 20. The rear arm 20 and the rear wheel 22 are suspended from the body frames 12 by a rear cushion 23.

The right and left body frames 11 have lower parts to which foot steps 24 (only one of them is shown in the drawing) are attached. The rear arm 20 has a lower part on which a side stand 25 is pivoted by a shaft 26. The side stand 25 is biased toward the closed position by a return spring 27.

The rear arm 20 has an approximately circular portion at the rear end, in which an axial gap electric motor 28 is housed.

Figure 2:
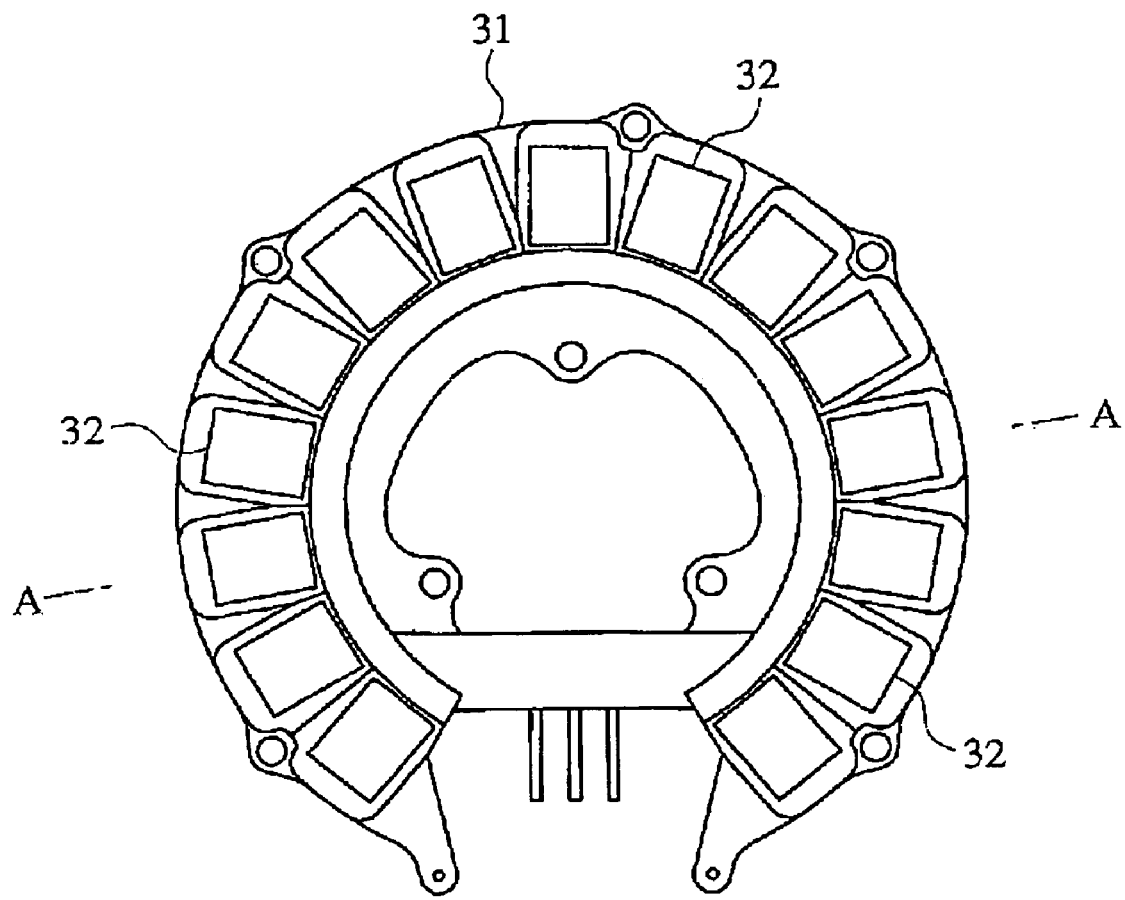
FIG. 2(a) is a plan view of a stator.
FIG. 2(b) is a sectional view taken on line A-A of FIG. 2(a).
Figure 2:
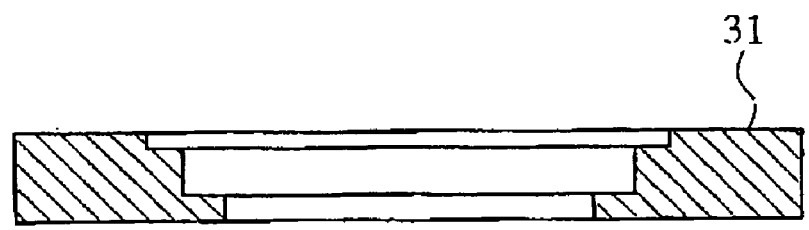

FIG. 2(a) is a plan view of a stator, and FIG. 2(b) is a sectional view taken on line A-A of FIG. 2(a). A stator 31 as a component of the electric motor 28 is housed in a box at the rear end portion of the rear arm, or a case, for fixing. The stator 31 is arranged such that a plurality of coils 32 each consisting of a core and a winding are disposed in a circle and molded with resin or the like. At the front of the stator 31 is provided an encoder board (not shown), so that no coil 32 is disposed in this part.

Figure 3:
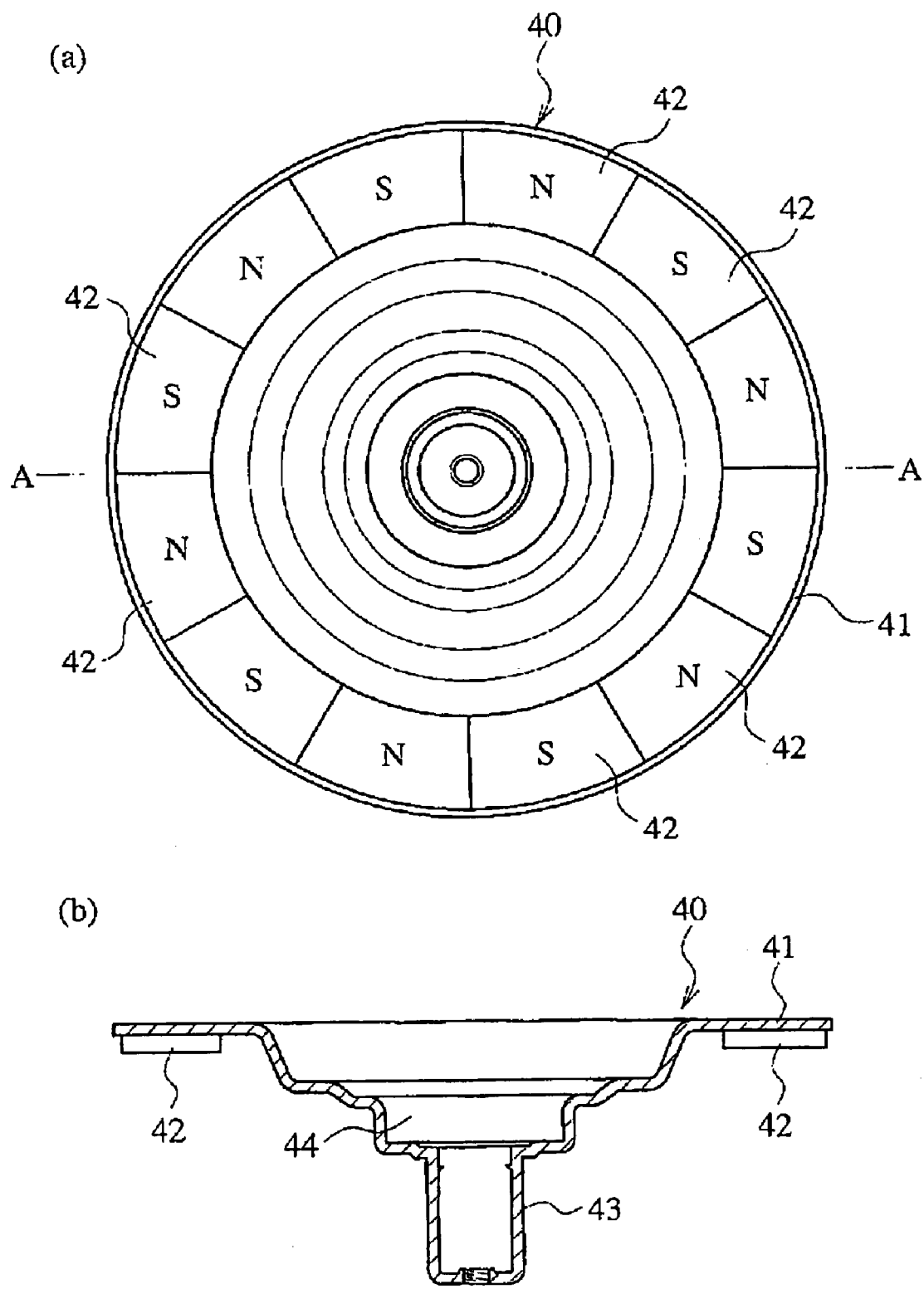
FIG. 3(a) is a plan view of a rotor.
FIG. 3(b) is a sectional view taken on line A-A of FIG. 3(a).

FIG. 3(a) is a plan view of a rotor, and FIG. 3(b) is a sectional view taken on line A-A of FIG. 3(a).

A rotor 40, which is rotated by electromagnetic energy from the stator 31, includes a yoke 41 and magnetic poles 42 bonded thereto. The yoke 41 is formed from a metal plate punched out in a disk-like shape and drawn stepwise concentrically, and formed with a cylindrical shaft portion 43 in its centermost part. The shaft portion 43 is a portion by which the yoke 41 is held for rotation. To the yoke 41 at the outside circumferential portion are bonded alternately S- and N-magnetic poles 42 of rectangular shape. That is, the yoke 41 is formed, integrally, with a magnetic pole-carrying face, a stepwise drawn portion and the shaft portion 43, so that it can be manufactured at a low costs. Also, a space 44 for a one-way clutch to be housed is formed by the stepwise drawn portion.

Figure 4:
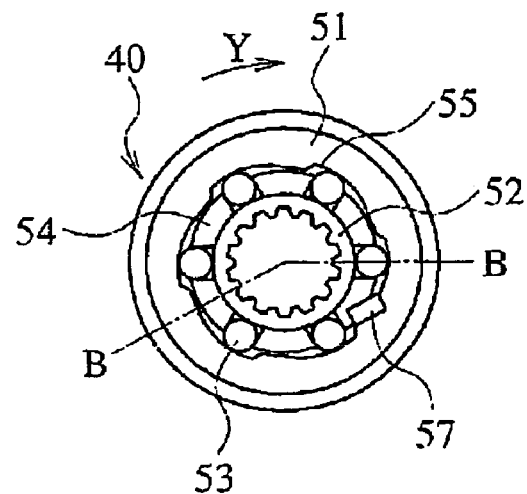
FIGS. 4(a) and 4(b) are views showing the rotor 40 with the one-way clutch being housed.
Figure 4:
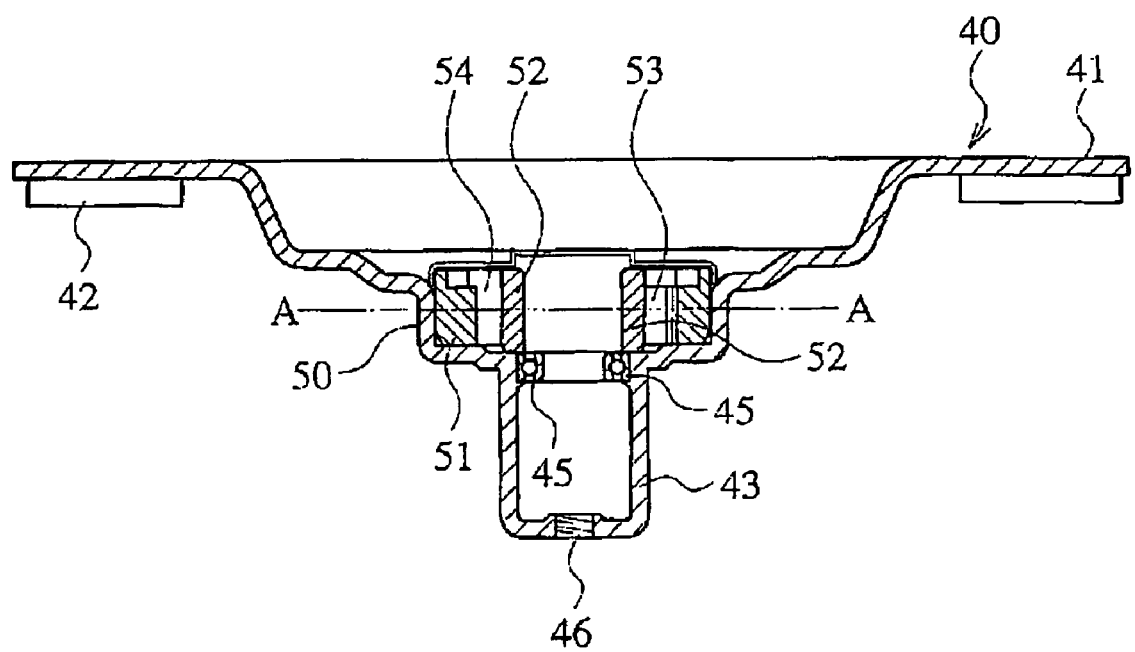

FIGS. 4(a) and 4(b) are views showing the rotor 40 with the one-way clutch being housed. FIG. 4(a) is a sectional view taken of line A-A of FIG. 4(b), and FIG. 4(b) is a sectional view taken on line B-B of FIG. 4(a). The one-way clutch 50 allows power transmission from the electric motor 28 to the rear wheel 22 and shuts off power transmission in the opposite direction, for the prevention of overcharging of a battery or for the mitigation of push and walk load. The one-way clutch 50 is press-fitted in a space 44 of the yoke 41 having a bearing 45 press-fitted in the shaft portion 43. The one-way clutch 50 is arranged such that a plurality of columnar rollers 53 are held between an outer race 51 and an inner race 52 each of a cylindrical shape. These rollers are held separate from each other by a roller holder 54. The roller holder 54 has a shape in which portions in the upper part of a cylinder corresponding to the rollers 53 are cut out. The outer race 51 is press-fitted in the yoke 41 for fixing. The inner race 52 rotates the rear wheel 22 through a planetary gear speed changer (not shown). In the inside circumferential surface of the outer race 51 at positions corresponding to the rollers are formed grooves 55 each having different depths at the left and right sides.

The arrow Y shows the direction of rotation of the yoke 41 when the rear wheel 22 is driven. A pin 57 contains a coil spring, having one end connected to the outer race 51 and the other end to the roller holder 54, and biases the roller holder 54 in the direction of Y, so that the rollers 53 are biased toward the shallower sides of the grooves 55.

If the electric motor 28 is driven and the yoke 41 rotates in the direction of the arrow the outer race 51 is rotated in the same direction and biases the roller holder 54 in the direction of Y, and the rollers are biased further toward the shallower sides of the grooves 55. Therefore, the rollers 53 are held between the outer race 51 and the inner race 52 and transmit a drive force from the outer race 51 to the inner race 52. Thus, the rear wheel is driven.

On the contrary, when a throttle is closed during running or at the time of push and walk, the rear wheel 22 is rotated and the inner race 52 rotates in association with the rotation of the wheel 22, while no drive force from the rotor 40 is transmitted to the outer race 51. In this case, the inner race 52 biases the rollers 52 toward the deeper sides of the grooves 55 against the force of the pin 57, so that no force is transmitted from the inner race 52 through the outer race 51 to the electric motor 28. Therefore a disadvantage can be prevented such that the electric motor 28 may generate electricity in such a case.

In addition, since a stepwise drawing process is applied to the yoke 41, a space can be provided, not around the shaft formed integral with the yoke 41 of the rotor 40, but inside the shaft. Therefore, a one-way clutch 50 can be disposed using the space, providing a compact structure. That is, a space for the one-way clutch to be housed is formed by the stepwise drawn portion, so that the one-way clutch 50 can be disposed near the rotational axis and thus the moment of inertia becomes lower, enabling the rear wheel to rotate at a low torque. Further, the rear wheel 22 becomes more compact, so that a slimmer rear wheel can be materialized with a higher design quality. The width of the rear wheel 22 can be decreased, enabling a larger banking.

In the rotor 40, in the cylindrical shaft portion 43 at the top, that is, on the rotational axis, is formed a female thread 46, into which a bolt can be fitted.

Figure 5:
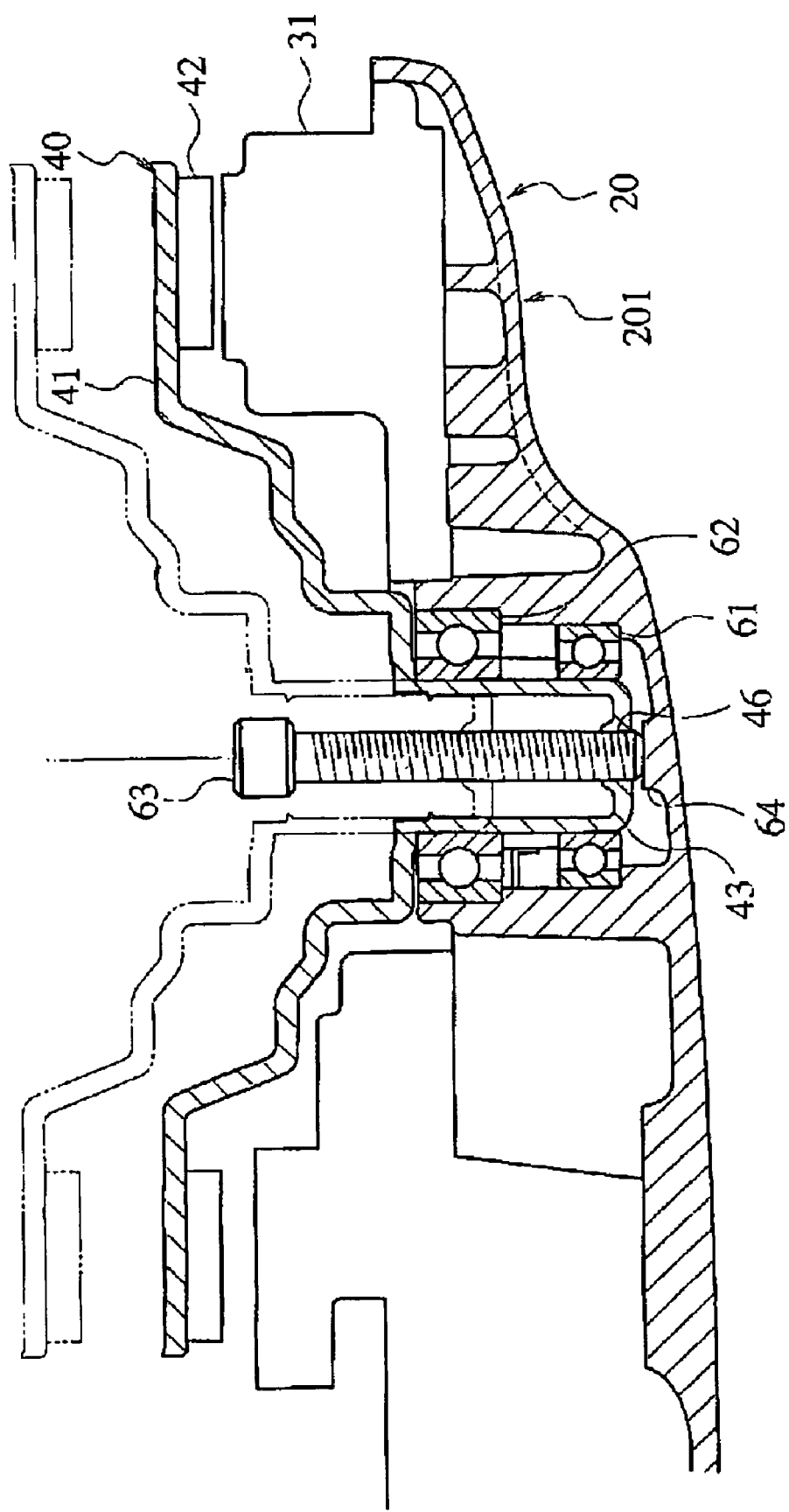
FIG. 5 is a view showing a method of removing the rotor 40.

FIG. 5 is a view showing a method of removing the rotor 40. As shown in solid lines, the rotor 40 is attracted by the stator 31 with its shaft portion 43 inserted in bearings 61, 62 provided in a box at the rear end portion of the rear arm 20, or a case 201. When the rotor 40 is removed at the time of maintenance or the like, a bolt 63 is inserted inside the shaft portion 43 and fitted into the female thread 46 for driving. Then, the forward end of the bolt 63 protrudes relatively from the top of the shaft portion 43. The forward end of the bolt 63 comes in abutment against the inner side of the case 201, so that the drive force of the bolt 63 separates the yoke 41 from the stator 31 little by little against the magnetic force of the magnetic poles 42 through reaction from the case 201. Therefore, the rotor can be removed easily from the stator 31 attached to the case 201, as shown in double dot and dash lines. At a position in the inner side of the case 201 at which the forward end of the bolt 63 is in abutment against the case 201, is formed a thick portion 64, thereby preventing damage to the case 201, or the like.

Now, another embodiment of the rotor will be described.

Since a female thread formed in the rotor is required to be provided only in a face perpendicular to the rotational axis, it may be provided at the top of the shaft portion, as in the foregoing rotor 40, or a plurality of female threads may be formed around the rotational axis at regular intervals. This arrangement also allows easy removal of the rotor, improving maintainability.

Figure 6:
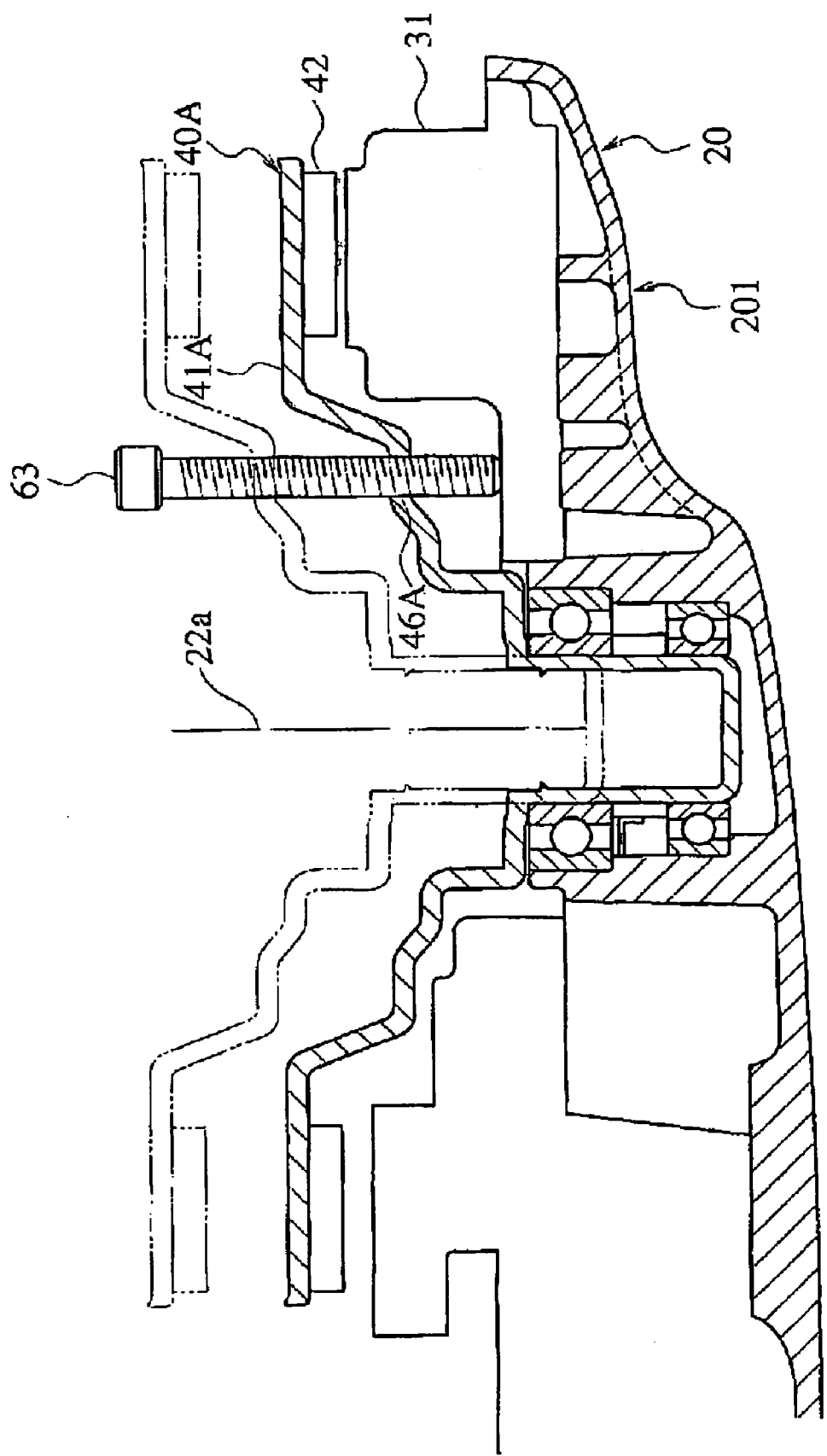
FIG. 6 is a view showing a method of removing the rotor 40A.

FIG. 6 is a view showing a method of removing the rotor 40A having a plurality of female threads formed around the rotational axis at regular intervals.

A yoke 41A of the rotor 40A has a plurality of female threads 46A (only one is shown in FIG. 6) formed around the rotational axis 22a of the rear wheel 22 at regular intervals. When the rotor 40A is removed at the time of maintenance or the like, into the female threads 46A are fitted corresponding bolts 63 from the opposite side of the stator, which are driven uniformly. Then, the forward ends of the bolts 63 protrude from the yoke 41A and come in abutment against the stator 31, so that the drive force of the bolts 63 separates the yoke 41A from the stator 31 little by little against the magnetic force of the magnetic poles 42 through reaction. Therefore, the rotor can be removed easily from the stator 31 attached to the case 201, as shown in double dot and dash lines. Also, the female threads 46A are provided at regular intervals around the rotational axis 22a, so that posture of the rotor 40A is stabilized.

Figure 7:
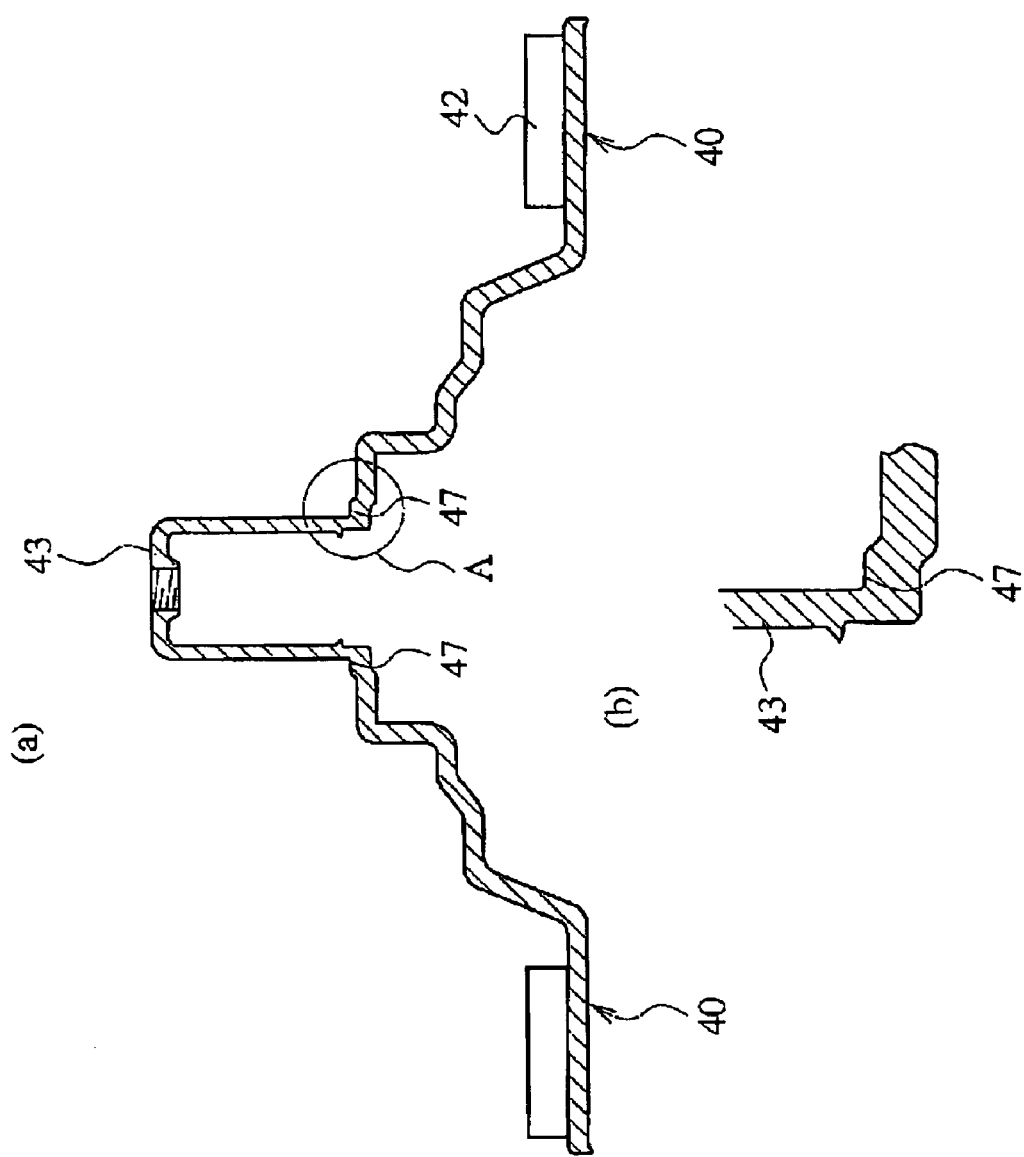
FIG. 7(a) is a view showing the shape of the rotor 40A in detail.
FIG. 7(b) is an enlarged view of the portion A of FIG. 7(a).

FIG. 7(a) is a view showing the shape of the rotor 40A in detail, and FIG. 7(b) is an enlarged view of the portion A of FIG. 7(a).

Since a yoke 41 of the rotor 40 is formed with a flat face 47 perpendicular to the rotational axis, when magnetic poles 42 are bonded to the yoke 41, an accurate gap control (so called positioning) can be achieved by applying a certain pressure to the magnetic poles with a jig or the like using the flat face 47 as reference, or by controlling the distance from the flat face 47.

Even a rotor including in combination a face carrying the magnetic poles 42 and a shaft portion 43 will produce the same effect and function if it is formed with a face perpendicular to the rotational axis.

In addition, since the face perpendicular to the rotational axis is provided in the rotor 40A, the rotor 40A will produce the same effect and function.

Further, this embodiment can be applied not only to electric motors but also to rotary electric machines including generators.

As described above, the rotary electric machine of this embodiment has a fixed stator, and a rotor rotated by electromagnetic energy from the stator, characterized in that the rotor has in its radially outer region a magnetic pole-carrying face, a stepwise drawn portion concentrical with the face, and a cylindrical shaft portion, on the rotational axis of the rotor, formed in its radially inner region. The shaft portion or the stepwise drawn portion is formed with a face perpendicular to the rotational axis. Therefore, an accurate gap control can be achieved by applying a certain pressure to the magnetic poles with a jig or the like using the flat face as a reference, or by controlling the distance from the flat face. As a result, a rotary electric machine with high productivity/maintainability can be provided.

Further, since a space for a one-way clutch to be housed can be formed by the stepwise drawn portion, if the one-way clutch is housed in this space, a more compact and thinner design can be materialized.

Further, since the magnetic pole-carrying face, the stepwise drawn portion and the shaft portion are formed integral with each other, handling becomes easier, providing a high productivity.

Further, since a female thread is formed in the perpendicular face, if a bolt is fitted in the female thread and the bolt is brought into abutment against the case or the like, the rotor can be removed easily against the attractive force of the stator.

Further, since a female thread is formed on the rotational axis, the rotor can be removed in a balanced relation.

Further, since a plurality of female threads are formed around the rotational axis at regular intervals, this arrangement also allows the rotor to be removed in a balanced relation.

The invention claimed is:

1. A rotary electric machine comprising:
    a case;
    bearings provided in the case;
    a stator fixed to the case; and
    a rotor rotated by electromagnetic energy from the stator, wherein the rotor includes:
    magnetic poles having one end face facing the stator and another end face attached to a face in a radially outer region of the rotor;
    a stepwise drawn portion concentrical with the one end face, wherein a space for a one-way clutch to be housed is formed by the stepwise drawn portion; and
    a drawn shaft portion located on a rotational axis of the rotor and being inserted into and supported by the bearings,
    wherein the face in the radially outer region of the rotor is formed perpendicular to the rotational axis of the rotor, and
    another face perpendicular to the rotational axis of the rotor is formed in the stepwise drawn portion or the shaft portion.

2. The rotary electric machine as set forth in claim 1, wherein the magnetic pole-carrying face, the stepwise drawn portion and the shaft portion are formed integral with each other.

3. The rotary electric machine as set forth in claim 1, wherein the another face perpendicular to the rotational axis of the rotor formed in the stepwise drawn portion is formed in a region of the stepwise drawn portion, where the stepwise drawn portion is pressed against the bearings on the stator into which the shaft portion is inserted.

4. The rotary electric machine as set forth in claim 1, wherein the stator includes a plurality of coils.

5. The rotary electric machine as set forth in claim 4, wherein the plurality of coils includes a core and a winding.

6. The rotary electric machine as set forth in claim 5, wherein the core and the winding are disposed in a circle and molded with a resin.

7. The rotary electric machine as set forth in claim 1, wherein the shaft portion is cylindrical.

8. The rotary electric machine as set forth in claim 1, wherein the stator includes an encoder board.

9. The rotary electric machine as set forth in claim 1, wherein the one-way clutch is press-fitted in a space of a yoke having the bearings press-fitted in the shaft portion.

10. A rotary electric machine comprising:
    a case;
    bearings provided in the case;
    a stator fixed to the case; and
    a rotor rotated by electromagnetic energy from the stator, wherein the rotor includes:
    magnetic roles having one end face facing the stator and another end face attached to a face in a radially outer region of the rotor;
    a stepwise drawn portion concentrical with the one end face; and a drawn shaft portion located on a rotational axis of the rotor and being inserted into and supported by the bearings, wherein the face in the radially outer region of the rotor is formed perpendicular to the rotational axis of the rotor, and another face perpendicular to the rotational axis of the rotor is formed in the stepwise drawn portion or the shaft portion, wherein the female thread is formed in the another perpendicular face and on the rotational axis.

11. The rotary electric machine as set forth in claim 10, wherein the female thread is formed in a plurality around the rotational axis at regular intervals.

12. A rotary electric motor machine, comprising:
a case;
bearings provided in the case;
a stator fixed to the case;
a rotor rotated by electromagnetic energy from the stator;
wherein the rotor has in its radially outer region a magnetic pole-carrying face that is perpendicular to the rotational axis of the rotor, a stepwise drawn portion concentrical with the magnetic pole-carrying face, wherein a space for a one-way clutch to be housed is formed by the stepwise drawn portion, and a drawn shaft portion, on a rotational axis of the rotor, formed in its radially inner region, the shaft portion being inserted into and supported by the bearings, and the shaft portion or the stepwise drawn portion being formed with a face perpendicular to the rotational axis; and a female thread formed in the perpendicular face.

13. The rotary electric machine as set forth in claim 12, wherein the stator includes a plurality of coils.

14. The rotary electric machine as set forth in claim 12, wherein the shaft portion is cylindrical.

* * * * *